April 13, 1965   W. T. COWLEY   3,178,073
FOOD MIXTURE DEPOSITING MACHINE
Filed April 9, 1963                              4 Sheets-Sheet 1

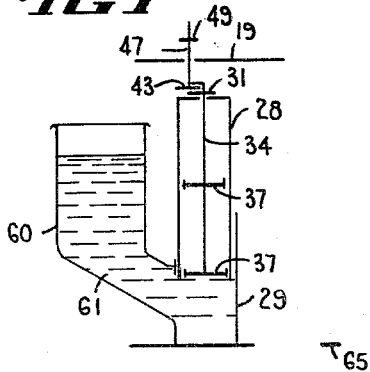
FIG 1

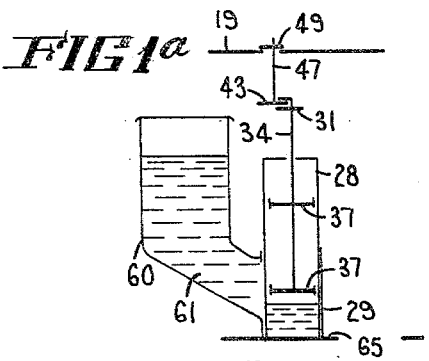
FIG 1a

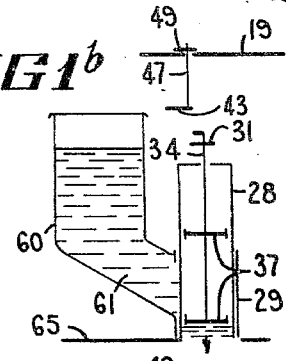
FIG 1b

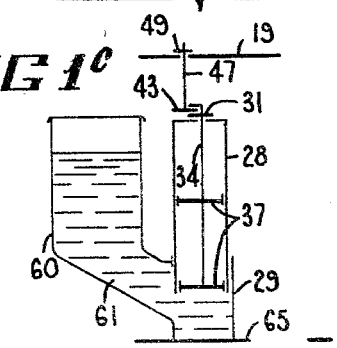
FIG 1c

STAGE 1

SLEEVE UP
PISTON UP
GATE CLOSED
FILLING FLOWS INTO CYLINDER

STAGE 2

SLEEVE LOWERS TO REGISTER IN BOTTOM
OF CYLINDER
PISTON RETAINED IN INTERMEDIATE POSITION

STAGE 3

SLEEVE AT BASE OF STROKE GATE OPENS AND AT
SAME TIME PISTONS RELEASED TO DROP
DUE TO THEIR OWN WEIGHT

STAGE 4

GATE CLOSES
SLEEVE RETURNS TOWARDS ITS UP
POSITION, CARRYING PISTON WITH IT

Inventor
William T. Cowley
By Oldham & Oldham
ATTYS.

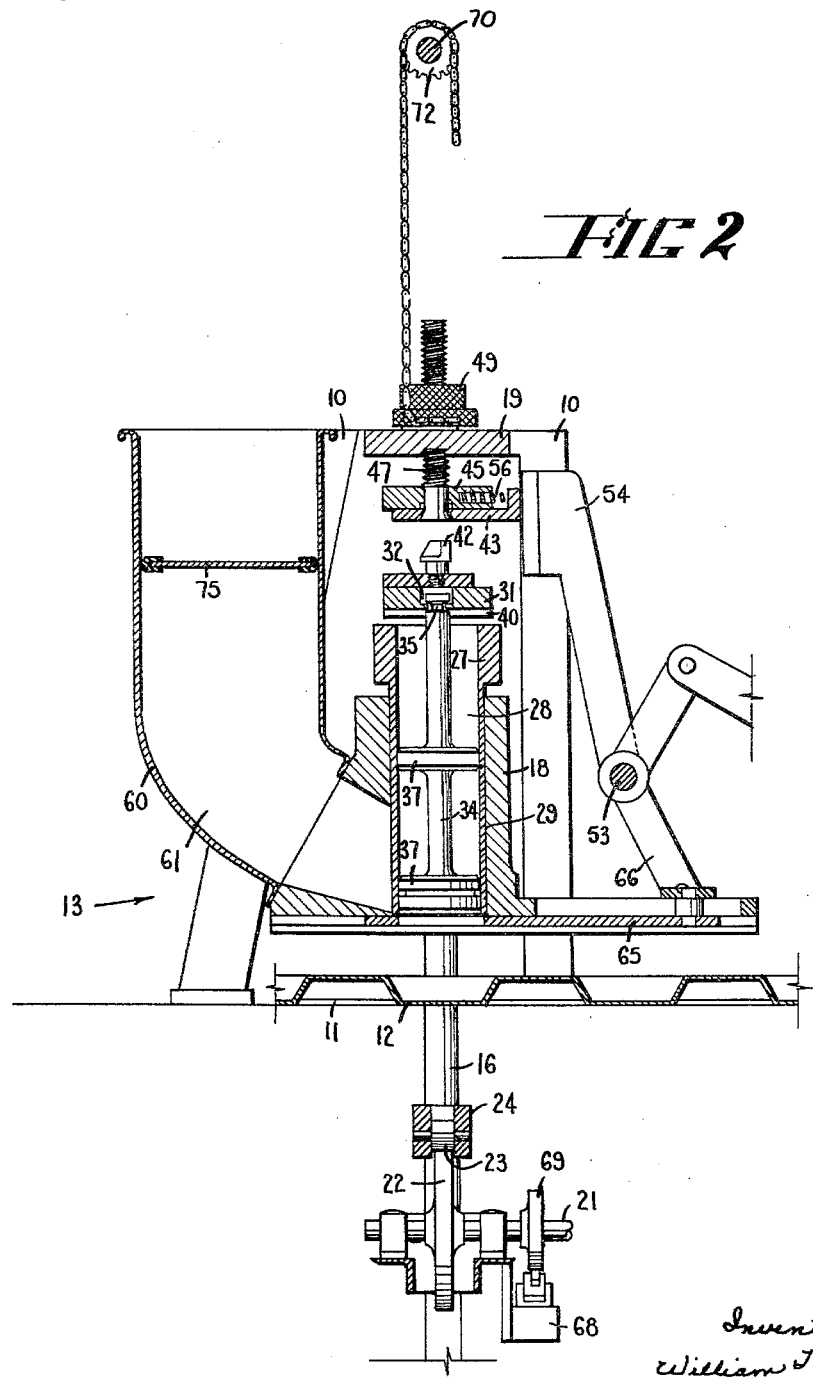

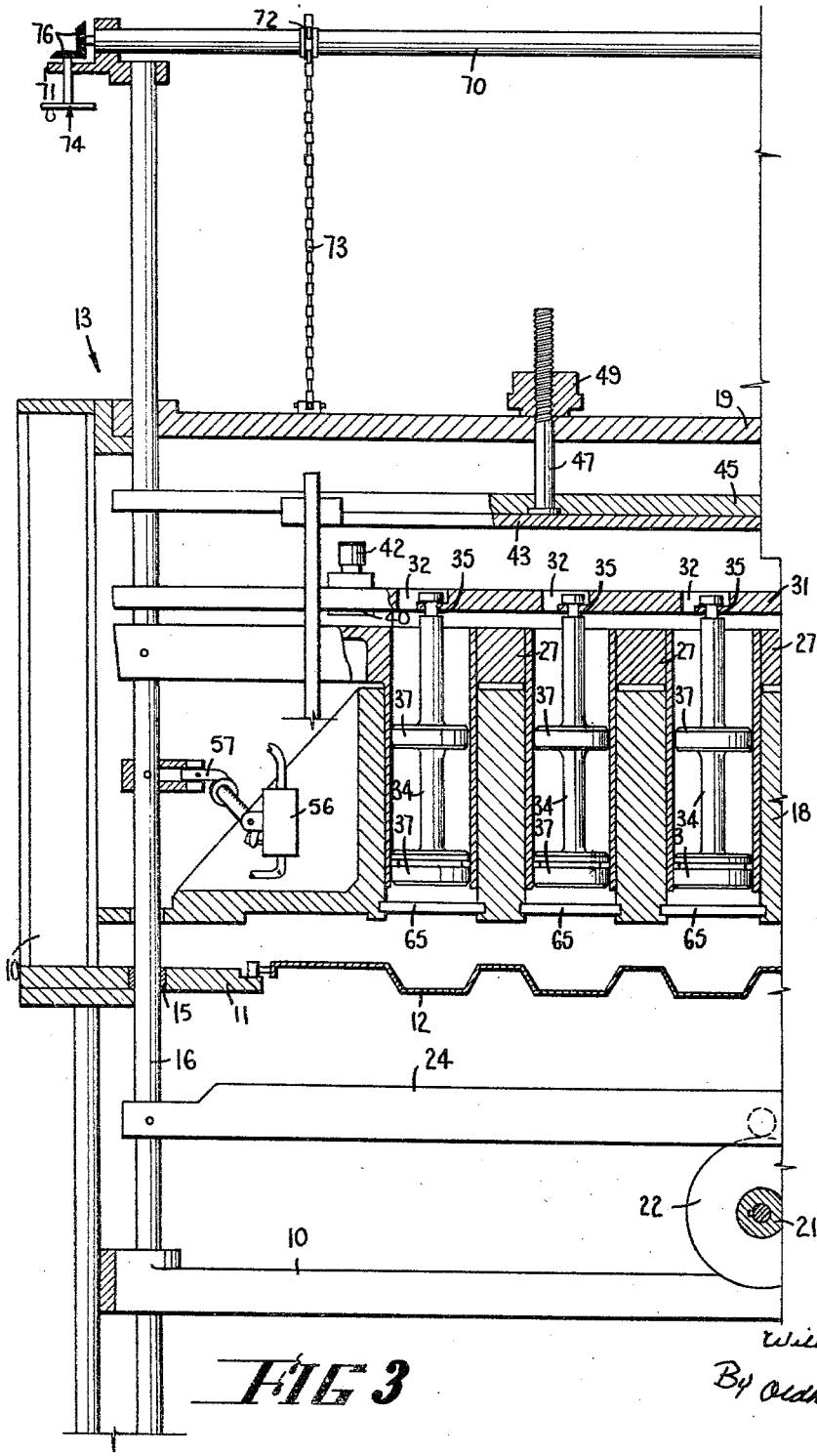

April 13, 1965   W. T. COWLEY   3,178,073
FOOD MIXTURE DEPOSITING MACHINE
Filed April 9, 1963   4 Sheets-Sheet 4
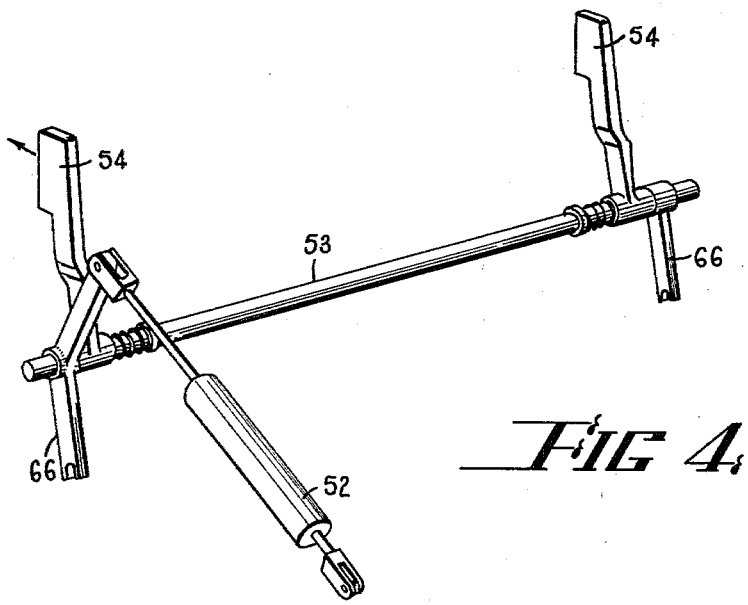
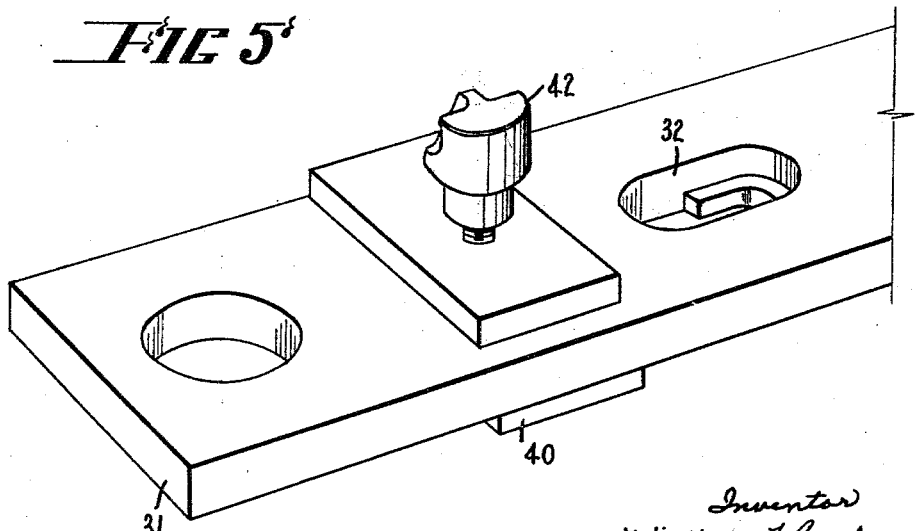

United States Patent Office 3,178,073
Patented Apr. 13, 1965

3,178,073
FOOD MIXTURE DEPOSITING MACHINE
William T. Cowley, 508–510 Cross Road, Glandore,
South Australia, Australia
Filed Apr. 9, 1963, Ser. No. 271,785
Claims priority, application Australia, Apr. 10, 1962,
16,423/62
10 Claims. (Cl. 222—267)

This invention relates to a machine for the depositing of food mixtures.

In the manufacture of certain items of food as for example pies, it is common practice to charge a pasty mixture into a container, for example a meat or fruit mixture into a container in which a pastry layer has already been placed. This operation has previously been effected by machines which are frequently inaccurate, and agitate the pasty mixture unduly, and the main object of this invention is to provide a simple machine which can be used for the depositing of liquids or semi-liquids in accurately gauged quantities, and without unduly agitating the liquids or semi-liquids, or mashing substances such as fruit or the like.

In its simplest form this invention may be said to consist of a machine which comprises a frame, a cylinder block on said frame containing a cylinder, a feed aperture through said cylinder block opening into the side wall of said cylinder, feed means in communication with said feed aperture, a sleeve axially slidable in said cylinder from a position with its lower edge above said feed aperture, to a position with its lower edge below said feed aperture, a piston slidably engaging the inner wall of said sleeve, releasable retaining means between said piston and said frame retaining said piston in a position intermediate its top and lowest positions during downward movement of said sleeve in said cylinder, and closure means at the base of said cylinder containing a discharge opening positionable beneath said cylinder.

An embodiment of the invention is described hereunder in some detail with reference to and is illustrated in the accompanying drawings, in which FIG. 1 is a diagrammatic representation of the machine showing the first stage of its operation, FIG. 1a is a view similar to FIG. 1 but showing the second stage of the machine operation, FIG. 1b is a diagrammatic view similar to FIG. 1 but showing the third stage of operation of the machine, FIG. 1c is a diagrammatic representation of the machine showing its fourth stage of operation, FIG. 2 is a longitudinal section through the machine, FIG. 3 is a fragmentary transverse section through the machine, FIG. 4 is a perspective view of the air operated piston release and gate control mechanism, and FIG. 5 is a fragmentary perspective view of the piston plate of the machine.

According to this embodiment, a main frame 10 has a pair of longitudinal rails 11 adapted to carry food-receiving containers 12 into and then through a machine 13. The longitudinal rails 11 have secured to their outer sides guide bushes 15, each slidably supporting a post 16, the two posts being disposed transversely of the rails 11 and to their outside. The main frame 10 has secured to it a transversely disposed cylinder block 18 positioned above the path of travel of the food containers 12 and also a transversely disposed upper fixed plate 19 parallel to the cylinder block 18 but disposed some distance above it.

A longitudinally extending driven shaft 21 has a lifting cam 22 thereon which engages a roller 23 disposed centrally on a lower bridge 24 which is secured at its ends to the posts 16, and when the shaft 21 is driven and the lifting cam 22 rotates, the lower bridge 24 is raised or lowered to raise or lower the posts 16 respectively.

Disposed above the cylinder block and secured to the reciprocable upstanding posts is a lifting plate 27, the lifting plate 27 having a number of sleeves 28 depending from it, the sleeves 28 slidably engaging cylinders 29 in the cylinder block 18 with which they are axially aligned.

Slidably journalled to the reciprocable posts, and disposed above the lifting plate 27, is a piston plate 31 (see particularly FIG. 5), the piston plate 31 having in it a row of "key hole" slots 32. Each of a plurality of piston rods 34 has a groove 35 near its upper end so that it is normally retained in the key hole slot 32 but can be removed therefrom by transverse movement when the pistons 37 thereon are taken out of the sleeves 28.

The piston plate 31 has a pair of pads 40 on its under face which are adapted to engage the upper surface of the cylinder block 18 thus limiting downward movement of the pistons 37 within the sleeves 28 when the piston plate 31 is released. The piston plate 31 also has a pair of latch members 42 upstanding therefrom, and these are engageable over a latch bar 43 upstanding therefrom, and these are engageable over a latch bar 43 which is spring loaded on a piston retaining bar 45 which is also slidably journalled on the reciprocable posts 16.

The piston retaining bar 45 is linked by means of stroke adjustment screws 47 which pass through clearance holes in the upper fixed plate 19, the arrangement being such that upon a downward movement of the lifting plate 27, the piston retaining bar 45 moves downwardly by a distance the magnitude of which is adjusted by nuts 49 on the screws 47. The latches 42 are retained by the latch bar 43, thereby retaining the piston plate 31, and in turn the pistons 37, in an intermediate position, while the lifting plate continues on its downward traverse under the influence of the lifting cam 22, until such time as the latches 42 are released from the latch bar 43.

The latch bar 43 is releasable under the control of a small air cylinder 52 trunnion mounted on the frame 10 and operable to rock a transverse rocker shaft 53 which carries striker bars 54 which drive the latch bar 43 across to a latch release position (FIGS. 2 and 5). The latch bar 43 is returned by a spring 56 towards a locked position. This air cylinder 52 is initiated for latch bar release by an air valve 56 on the frame 10 engaged by a trigger 57 on a post 16.

A long hopper 60 is disposed transversely and is in communication with each of the cylinders 29 of the cylinder block 18, the hopper 60 being adapted to receive a pasty liquid and discharge through feed apertures 61 through the cylinder block 18 opening into the side walls of the cylinders 29 as long as the sleeves 28 are in their upper position. However when the sleeves 28 are lowered within the cylinders 29, they automatically at the same time close the feed apertures 61 between the hopper 60 and the cylinders 29.

The lower ends of the cylinders 29 are closed by closure means which in this embodiment are constituted by the valve gate 65 which is slidable in the base of the cylinder block 18 under control of the gate lever arms 66 on the shaft 53. The arrangement is such that the latch release movement of the striker bars 54 is simultaneous with opening of the gate 65, while closure of the gate 65 is effected by reverse movement of the air cylinder 52 initiated by the air valve 68 operated by the cam 69 on the shaft 21.

It is desirable that the machine be easily cleaned, and this in turn is facilitated by quick dismantling of the machine. This is achieved in this embodiment by an upper transverse shaft 70 journalled in bearings 71 on the top ends of the posts 16, and carrying sprockets 72 over which are disposed roller chains 73 secured at their lower ends to the upper fixed plate 19. Rotation of the handle 74 rotates the upper shaft 70 through bevel gears 76, thus lifting the upper fixed plate 19 and in turn lifting the pistons 37 out from the sleeves 28, whereupon the pistons 37 can be removed from the "key hole slots" 32.

The manner in which the machine functions is as follows:

The hopper is charged with a pasty mass, say for example a sauce for filling meat pies. A series of containers are run in on the rails to be positioned beneath the cylinders of the cylinder blocks, and the longitudinally extending shaft is rotated by drive means (not shown), in turn rotating the cam 22 which allows the posts 16 to move downwardly through their guide bushes 15 on the frame 10. This in turn allows the piston retaining bar 45 to drop a small amount, temporarily retaining the pistons in an intermediate position while the sleeves drop within the cylinders of the cylinder block until the downward motion of the pistons is arrested, the lower ends of the pistons are at about the same level as the lower ends of the sleeves, so that the volume of sauce within the cylinders is accurately gauged. While the pistons are restrained from further downward movement, the sleeves are carried downwardly by the posts, past the feed apertures in the cylinder walls, thereby preventing further feed, until the bottom ends of the sleeves contact the closed gate beneath the cylinders. At this stage the gate is timed to open through its operating air cylinder, and the latch bar also opens, and the air cylinder is operated to release the pistons so that they may move downwardly into the sleeves and thereby eject the charge of sauce from the space within the sleeves. After discharge is complete, the piston plate is carried up by the lifting plate, and the latch bar and gate both return to their normal position. The latch bar in returning to its normal position engages the latches on the piston plate so that all the pistons are again linked to the piston retaining bar. Upon further rotation of the lifting cam on the longitudinal shaft, the sleeves are lifted upwardly so that the cylinders are then opened to receive their maximum charge.

Use may be made of a suction plate 75 within the hopper 60 to reduce separation of liquids and solids.

What I claim is:

1. A food mixture depositing machine comprising
   a frame,
   a pair of spaced parallel posts reciprocable in said frame,
   a transversely disposed upper fixed plate on said frame,
   a transversely disposed piston retaining bar beneath said upper fixed plate and slidable on said posts,
   strike limit means between said piston retaining bar and said upper fixed plate,
   a cylinder block on said frame containing a cylinder,
   a feed aperture through said cylinder block opening into the side wall of said cylinder,
   feed means in communication with said feed aperture,
   a sleeve fixed relative to said posts and axially slidable in said cylinder from a position with its lower edge above said feed aperture to a position with its lower edge below said feed aperture,
   a piston slidably engaging the inner wall of said sleeve,
   releasable latch means between said piston and said piston retaining bar, and
   closure means at the base of said cylinder containing a discharge opening positionable beneath said cylinder.

2. A food mixture depositing machine comprising
   a frame,
   a pair of spaced parallel posts reciprocable in said frame,
   a transversely disposed upper fixed plate on said frame,
   a transversely disposed piston retaining bar beneath said upper fixed plate and slidable on said posts,
   stroke limit means between said piston retaining bar and said upper fixed plate,
   a transversely disposed piston plate beneath said piston retaining bar and slidable on said posts,
   a transversely disposed lifting plate beneath said piston plate and fixed on said posts,
   a cylinder block on said frame containing a cylinder,
   a feed aperture through said cylinder block opening into the side wall of said cylinder,
   feed means in communication with said feed aperture,
   a sleeve secured to and depending from said lifting plate and axially slidable in said cylinder from a position with its lower edge above said feed aperture to a position with its lower edge below said feed aperture,
   a piston depending from said piston plate and slidably engaging the inner wall of said sleeve,
   releasable latch means between said piston retaining bar and said piston plate retaining said piston in a position intermediate its top and lowest positions during downward movement of said sleeve in said cylinder, and
   closure means at the base of said cylinder containing a discharge opening positionable beneath said cylinder.

3. A food mixture depositing machine comprising
   a frame,
   a cylinder block fixed on said frame containing a transversely disposed row of cylinders,
   feed apertures through said cylinder block each opening into the side wall of a said cylinder,
   a hopper on said cylinder block communicating with said feed apertures,
   a transversely disposed valve gate slidable beneath said cylinder block,
   discharge openings in said valve gate positionable in or out of alignment with said cylinders,
   a pair of upstanding posts reciprocable in said frame,
   a transversely disposed lifting plate above said cylinder block secured at its ends to said posts,
   a plurality of tubular sleeves depending from said lifting plate one into each said cylinder and slidably engaging the walls thereof,
   a transversely disposed piston plate above said lifting plate slidably engaging said posts,
   a plurality of pistons each engaged by and depending from said piston plate into a said sleeve and slidably engaging the walls thereof,
   a transversely disposed piston retaining bar above said piston plate slidably engaging said posts,
   latch means on said piston retaining bar releasably engaging said piston plate,
   a transversely disposed upper fixed plate on said main frame slidably engaged by said posts, and
   stroke limit means on said piston retaining bar engageable against the upper surface of said fixed upper plate.

4. A food mixture depositing machine comprising
   a frame,
   a cylinder block fixed on said frame containing a transversely disposed row of cylinders,
   feed apertures through said cylinder block each opening into the side wall of a said cylinder,
   a hopper on said cylinder block communicating with said feed apertures,
   a transversely disposed valve gate slidable beneath said cylinder block,
   discharge openings in said valve gate positionable in or out of alignment with said cylinders,
   a shaft beneath said cylinder block,
   a lifting cam on said shaft,
   a lower transverse bridge above said lifting cam, a roller journalled in said bridge and engaged by said cam,
a pair of upstanding posts secured one on each end of said lower transverse bridge and reciprocable in said frame,
a transversely disposed lifting plate above said cylinder block secured at its ends to said posts,
a plurality of tubular sleeves depending from said lifting plate one into each said cylinder and slidably engaging the walls thereof,
a transversely disposed piston plate above said lifting plate slidably engaging said posts,
a plurality of pistons each engaged by and depending from said piston plate into a said sleeve and slidably engaging the walls thereof,
a transversely disposed piston retaining bar above said piston plate slidably engaging said posts,
latch means on said piston retaining bar releasably engaging said piston plate,
a transversely disposed upper fixed plate on said main frame slidably engaged by said posts, and
stroke limit means on said piston retaining bar engageable against the upper surface of said fixed upper plate.

5. A food mixture depositing machine comprising
a frame,
a cylinder block fixed on said frame containing a transversely disposed row of cylinders,
feed apertures through said cylinder block each opening into the side wall of a said cylinder,
a hopper on said cylinder block communicating with said feed apertures,
a transversely disposed valve gate slidable beneath said cylinder block,
discharge openings in said valve gate positionable in or out of alignment with said cylinders,
a pair of upstanding posts reciprocable in said frame,
a transversely disposed lifting plate above said cylinder block secured at its ends to said posts,
a plurality of tubular sleeves depending from said lifting plate one into each said cylinder and slidably engaging the walls thereof,
a transversely disposed piston plate above said lifting plate slidably engaging said posts,
a plurality of keyhole shaped slots in said piston plate,
a plurality of pistons each engaged by and depending from a said keyhole shaped slot into a said sleeve and slidably engaging the walls thereof.
a pair of latch members upstanding from said piston plate,
a transversely disposed piston retaining bar above said piston plate slidably engaging said posts,
a latch bar on said piston retaining bar releasably engaging said latch members,
a transversely disposed upper fixed plate on said main frame slidably engaged by said posts, and
stroke limit means on said piston retaining bar engageable against the upper surface of said fixed upper plate.

6. A food mixture depositing machine comprising
a frame,
a cylinder block fixed on said frame containing a transversely disposed row of cylinders,
feed apertures through said cylinder block each opening into the side wall of a said cylinder,
a hopper on said cylinder block communicating with said feed apertures,
a transversely disposed valve gate slidable beneath said cylinder block,
discharge openings in said valve gate positionable in or out of alignment with said cylinders,
a pair of upstanding posts reciprocable in said frame,
a transversely disposed lifting plate above said cylinder block secured at its ends to said posts,
a plurality of tubular sleeves depending from said lifting plate one into each said cylinder and slidably engaging the walls thereof,
a transversely disposed piston plate above said lifting plate slidably engaging said posts,
a plurality of pistons each engaged by and depending from said piston plate into a said sleeve and slidably engaging the walls thereof,
a pair of latch members upstanding from said piston plate,
a transversely disposed piston retaining bar above said piston plate slidably engaging said posts,
a latch bar on said piston retaining bar releasably engaging said latch members,
a transversely disposed upper fixed plate on said main frame slidably engaged by said posts,
stroke limit means on said piston retaining bar engageable against the upper surface of said fixed upper plate,
an upper transverse shaft journalled in bearings on the upper ends of said posts,
sprockets on said upper transverse shaft, and lifting chains each secured at one end to said upper fixed plate and passing over a said sprocket.

7. A food mixture depositing machine comprising
a frame,
a cylinder block fixed on said frame containing a transversely disposed row of cylinders,
feed apertures through said cylinder block each opening into the side wall of a said cylinder,
a hopper on said cylinder block communicating with said feed apertures,
a transversely disposed valve gate slidable beneath said cylinder block,
discharge openings in said valve gate positionable in or out of alignment with said cylinders,
a pair of upstanding posts reciprocable in said frame,
a transversely disposed lifting plate above said cylinder block secured at its ends to said posts,
a plurality of tubular sleeves depending from said lifting plate one into each said cylinder and slidably engaging the walls thereof,
a transversely disposed piston plate above said lifting plate slidably engaging said posts,
a plurality of pistons each engaged by and depending from said piston plate into a said sleeve and slidably engaging the walls thereof,
a transversely disposed piston retaining bar above said piston plate slidably engaging said posts,
latch means on said piston retaining bar releasably engaging said piston plate,
a transversely disposed upper fixed plate on said main frame slidably engaged by said posts,
stroke limit means on said piston retaining bar engageable against the upper surface of said fixed upper plate,
a transverse rocker shaft journalled in bearings on the frame,
an air cylinder between the frame and an arm on said rocker shaft,
a latch release striker bar on said rocker shaft, and
gate lever arms on said rocker shaft engaging said valve gate.

8. A food mixture depositing machine comprising
a frame,
a cylinder block fixed on said frame containing a transversely disposed row of cylinders,
feed apertures through said cylinder block each opening into the side wall of a said cylinder,
a hopper on said cylinder block communicating with said feed apertures,
a transversely disposed valve gate slidable beneath said cylinder block, discharge openings in said valve gate positionable in or out of alignment with said cylinders,
a shaft beneath said cylinder block,
a lifting cam on said shaft,
a lower transverse bridge above said lifting cam,
a roller journalled in said bridge and engaged by said cam,
a pair of upstanding posts secured one on each end of said lower transverse bridge and reciprocable in said frame,
a transversely disposed lifting plate above said cylinder block secured at its ends to said posts,
a plurality of tubular sleeves depending from said lifting plate one into each said cylinder and slidably engaging the walls thereof,
a transversely disposed piston plate above said lifting plate slidably engaging said posts,
a plurality of keyhole shaped slots in said piston plate,
a plurality of pistons each engaged by and depending from a said keyhole shaped slot into a said sleeve and slidably engaging the walls thereof,
a pair of latch members upstanding from said piston plate,
a transversely disposed piston retaining bar above said piston plate slidably engaging said posts,
a latch bar on said piston retaining bar releasably engaging said latch members,
a transversely disposed upper fixed plate on said main frame slidably engaged by said posts,
a pair of screws on said piston retaining bar passing through clearance apertures in said upper fixed plate,
a stroke limit nut on each said screw engageable against the upper surface of said fixed upper plate,
a transverse rocker shaft journalled in bearings on the frame,
an air cylinder between the frame and an arm on said rocker shaft,
a latch release striker bar on said rocker shaft, and
gate lever arms on said rocker shaft engaging said valve gate.

9. A food mixture depositing machine comprising
a frame,
a cylinder block fixed on said frame containing a transversely disposed row of cylinders,
feed apertures through said cylinder block each opening into the side wall of a said cylinder,
a hopper on said cylinder block communicating with said feed apertures,
a transversely disposed valve gate slidable beneath said cylinder block,
discharge openings in said valve gate positionable in or out of alignment with said cylinders,
a pair of upstanding posts reciprocable in said frame,
a transversely disposed lifting plate above said cylinder block secured at its ends to said posts,
a plurality of tubular sleeves depending from said lifting plate one into each said cylinder and slidably engaging the walls thereof,
a transversely disposed piston plate above said lifting plate slidably engaging said posts,
a plurality of keyhole shaped slots in said piston plate,
a plurality of pistons each engaged by and depending from a said keyhole shaped slot into a said sleeve and slidably engaging the walls thereof,
a transversely disposed piston retaining bar above said piston plate slidably engaging said posts,
latch means on said piston retaining bar releasably engaging said piston plate,
a transversely disposed upper fixed plate on said main frame slidably engaged by said posts,
a stroke limit means between said piston retaining bar and said fixed upper plate,
an upper transverse shaft journalled in bearings on the upper ends of said posts,
sprockets on said upper transverse shaft, and lifting chains each secured at one end to said upper fixed plate and passing over a said sprocket.

10. A food mixture depositing machine comprising
a frame,
a cylinder block fixed on said frame containing a transversely disposed row of cylinders,
feed apertures through said cylinder block each opening into the side wall of a said cylinder,
a hopper on said cylinder block communicating with said feed apertures,
a transversely disposed valve gate slidable beneath said cylinder block,
discharge openings in said valve gate positionable in or out of alignment with said cylinders,
a shaft beneath said cylinder block,
a lifting cam on said shaft,
a lower transverse bridge above said lifting cam,
a roller journalled in said bridge and engaged by said cam,
a pair of upstanding posts secured one on each end of said lower transverse bridge and reciprocable in said frame,
a transversely disposed lifting plate above said cylinder block secured at its ends to said posts,
a plurality of tubular sleeves depending from said lifting plate one into each said cylinder and slidably engaging the walls thereof,
a transversely disposed piston plate above said lifting plate slidably engaging said posts,
a plurality of keyhole shaped slots in said piston plate,
a plurality of pistons each engaged by and depending from a said keyhole shaped slot into a said sleeve and slidably engaging the walls thereof,
a pair of latch members upstanding from said piston plate,
a transversely disposed piston retaining bar above said piston plate slidably engaging said posts,
a latch bar on said piston retaining bar releasably engaging said latch members,
a transversely disposed upper fixed plate on said main frame slidably engaged by said posts,
a pair of screws on said piston retaining bar passing through clearance apertures in said upper fixed plate,
a stroke limit nut on each said screw engageable against the upper surface of said fixed upper plate,
a transverse rocker shaft journalled in bearings on the frame,
an air cylinder between the frame and an arm on said rocker shaft,
a latch release striker bar on said rocker shaft,
gate lever arms on said rocker shaft engaging said valve gate,
an upper transverse shaft journalled in bearings on the upper ends of said posts,
sprockets on said upper transverse shaft, and lifting chains each secured at one end to said upper fixed plate and passing over a said sprocket.

References Cited by the Examiner
UNITED STATES PATENTS

| | | | |
|---|---|---|---|
| 2,854,170 | 9/58 | Borgardt et al. | 222—381 X |
| 3,101,161 | 8/63 | Ivarson | 222—381 X |

RAPHAEL M. LUPO, *Primary Examiner.*